(12) United States Patent
Lysejko et al.

(10) Patent No.: US 7,142,583 B2
(45) Date of Patent: Nov. 28, 2006

(54) RECEIVER WITH PLURAL DETECTING PROCESSORS

(75) Inventors: Martin Lysejko, Bagshot (GB); Jeremy Laurence Cohen, Edgware (GB)

(73) Assignee: Airspan Networks Inc. PTSGE Corp., Seattle, WA (US)

( * ) Notice: Subject to any disclaimer, the term of this patent is extended or adjusted under 35 U.S.C. 154(b) by 730 days.

(21) Appl. No.: 10/094,346

(22) Filed: Mar. 8, 2002

(65) Prior Publication Data

US 2002/0126743 A1   Sep. 12, 2002

(30) Foreign Application Priority Data

Mar. 12, 2001 (GB) ................................ 0106015.1

(51) Int. Cl.
*H03H 7/30* (2006.01)
*H04B 1/10* (2006.01)
*H04L 1/00* (2006.01)
*H04L 25/08* (2006.01)

(52) U.S. Cl. ...................... 375/144; 375/229; 375/148; 375/346

(58) Field of Classification Search ................ 375/347, 375/130, 141, 143–144, 147–148, 152, 230, 375/232, 229, 343, 316, 350, 324, 346, 349; 455/307, 63, 67.11, 67.13
See application file for complete search history.

(56) References Cited

U.S. PATENT DOCUMENTS

| 5,907,303 A | 5/1999 | Yukitomo et al. ......... 342/380 |
| 6,560,299 B1 * | 5/2003 | Strolle et al. ............... 375/347 |

(Continued)

FOREIGN PATENT DOCUMENTS

DE    19509601 A    9/1996

(Continued)

*Primary Examiner*—Kevin Kim
*Assistant Examiner*—Linda Wong
(74) *Attorney, Agent, or Firm*—Mark A. Haynes; Haynes, Beffel & Wolfeld

(57) ABSTRACT

A receiver for detecting and recovering data from received data bearing radio signal samples comprises first and second detecting processors. Each of the detecting processors comprises a data store operable to store a predetermined number of the signal samples, an equalizer operable to combine the signal samples with a plurality of equalizer coefficients, to produce refined signal samples representative of the received signal samples but with the effect of inter-symbol interference caused by multi-path propagation experienced by the received radio signals at least partially reduced, a combiner operable to receive the refined signal samples from the equalizer and to receive second refined signal samples, from the other detecting processor, derived from a further received version of the received signals, and to combine the first and second refined signal samples, and a data processor operable to receive the stored signal samples from the data store, and to receive second stored signal samples and to adapt the equalizer coefficients for the first detecting processor and the equalizer coefficients for the second detecting processor, to the effect of increasing the probability of correctly recovering the data from the received radio signal samples. By communicating the stored signal samples from the sample store of each of the detecting processors to one of the data processors acting as a master detecting processor, the equalizer coefficients for the equalizer for each detecting processor can be calculated together to the effect of increasing the probability of correctly recovering the data from the combined signals. In preferred embodiments the equalizer is a linear equalizer. The receiver finds application, in particular but not exclusively, in recovering data from spread spectrum radio signals, as used for example in CDMA systems.

22 Claims, 5 Drawing Sheets

U.S. PATENT DOCUMENTS 6,744,806 B1 * 6/2004 Moore et al. ............... 375/130
2002/0126741 A1 * 9/2002 Baum et al. ................ 375/144

FOREIGN PATENT DOCUMENTS

| EP | 0 948 082 A | 10/1999 |
| WO | WO 99/41852 | 8/1999 |
| WO | WO 00 25447 A | 5/2000 |

* cited by examiner

RECEIVER WITH PLURAL DETECTING PROCESSORS

BACKGROUND OF THE INVENTION

1. Field of the Invention

The present invention relates to receivers for detecting and recovering data from received spread spectrum signals.

2. Description of the Prior Art

Multiple access radio communications techniques provide a facility for supporting several radio communications channels contemporaneously within the same radio frequency bandwidth. One such multiple access technique is Code Division Multiple Access (CDMA). Those acquainted with the field of radio communications will appreciate that the term CDMA is applied to several known radio access interfaces such as IS-95, Wide band CDMA, Joint Detection also known as TD-CDMA as proposed for third generation mobile radio, as well as other fixed and mobile radio standards. The term CDMA is therefore not limited to any particular radio access standard but should be interpreted as including any radio access interface for providing contemporaneous communications to a plurality of users using spread spectrum radio communications.

Generally, with a CDMA communication system the data to be communicated is arranged to modulate a spreading code. The modulated spreading code has a bandwidth which is much wider than the bandwidth of the base band signal. At a receiver the spreading code is reproduced and correlated with the received spread-spectrum signal. A so called "coding gain" is produced as a result of the correlation, between the reproduced spreading code, and the modulated spreading code present in the received spread spectrum signals. Data symbols can be recovered from the result of the correlation in the presence of other spread spectrum signals produced from different spreading codes.

Known receivers for detecting and recovering data from spread spectrum signals include the Rake receiver. The Rake receiver is provided with a plurality of correlators, each of which is arranged to correlate the received signal with a reproduced version of the spreading code offset in time by a different amount. Each correlator thereby generates an output which is combined to form a composite signal from which the data can be detected. In this way the data can be recovered in the presence of multi-path propagation, by setting the respective delays in correspondence with an anticipated spread of delays of each of the paths of the multi-path propagation profile.

SUMMARY OF INVENTION

According to the present invention there is provided a receiver for detecting and recovering data from received data bearing radio signal samples, the receiver comprising first and second detecting processors, said first and second detecting processors comprising a data store operable to store the received signal samples, an equaliser operable to combine the received signal samples with a plurality of equaliser coefficients, to produce refined signal samples representative of the received signal samples but with the effect of inter-symbol interference caused by multi-path propagation of the received radio signals at least partially reduced, a combiner means operable to receive the refined signal samples from the equaliser and to receive second refined signals samples, from the other detecting processor, derived from a further received version of the received signal, and to combine the first and second refined signal samples, and a data processor operable to receive the stored signal samples from the data store, wherein the data store of said first detecting processor is operable to receive second signal samples from the data store of the second detecting processor and to adapt the equaliser coefficients for said first detecting processor and the equaliser coefficients for said second detecting processor in dependence upon the first and the second stored signal samples, to the effect of increasing the probability of correctly recovering the data from the received radio signal samples.

It is known to combine a plurality of received signal versions, each received respectively from one of a corresponding plurality of antennae, to provide a gain from diversity by combining the received versions. The term diversity as used in the technical field of radio communications refers to a technique for receiving or transmitting different versions of a radio signal from different antennae. Preferably, the antennae are separated by a distance to the effect that the propagation conditions at each antenna are at least partially de-correlated.

Embodiments of the present invention provide a facility for combining a plurality of detecting processors each of which is arranged to process a different version of a received signal with an equaliser to provide refined signals. The refined signal samples from each equaliser are then communicated to the data processor of one of the detecting processors which acts as a master. The refined signals from each detecting processor are then fed to a combiner and combined in the master detecting processor. By communicating the stored signal samples from the sample store of each of the detecting processors, to the data processor of the master detecting processor, the equaliser coefficients for the equaliser for each detecting processor can be calculated together to the effect of increasing as far as possible the probability of correctly recovering the data from the combined signals.

Embodiments of the present invention afford a particular advantage in providing a modular architecture in that a diversity receiver can be formed from any number of antennae in combination with associated detecting processors. For this architecture one of the detecting processors acts as a master detecting processor and performs the combined calculation of the equaliser coefficients, which are then distributed to the equalisers of the other detecting processors.

As will be appreciated by those skilled in the art, equalisers are operable to alleviate or at least reduce the effects of inter-symbol interference. However as will be appreciated in some circumstances, residual inter-symbol interference may remain, albeit as far as possible at a reduced effect. As such, the signal samples at the output of the equaliser will be referred to herein as refined signal samples which is intended to infer that the effect of the inter-symbol interference in the received signal samples is reduced after being combined with the equaliser coefficients.

Although it will be appreciated that various types of equaliser may be used, in preferred embodiments the equaliser is a linear equaliser. As will be explained shortly the linear equaliser is generally effective in reducing inter-symbol interference present in a received signal, has a relatively low complexity in comparison to other equalisers and provides a particular advantage for embodiments of the invention which are arranged to recover data from spread spectrum radio signals. However, in other embodiments the equaliser may be a maximum likelihood sequence estimator type equaliser.

The term linear equaliser is a term which is intended to confer a broad meaning of equalisers formed from linear transversal filters. Examples of linear equalisers are disclosed in chapter 6.4, from page 554 of "Digital Communications" second edition by John G. Proakis, published by McGraw-Hill International Editions ISBN 0-07-100269-3.

In order to effect calculation of the equaliser coefficients, in preferred embodiments the data processor comprises first and second trial equalisers operable to combine the first and second stored signal samples with first and second trial equaliser coefficients, to produce first and second trial refined signal samples, a combiner operable to combine the first and the second trial refined signal samples to form a trial composite signal, and a de-modulating processor operable to de-modulate the trial composite signal to recover a least a portion of data, and a feed back processor operable to control the first and the second trial equalisers, the combiner and the de-modulating processor to form a further version of the recovered portion of the data and to adapt the first equaliser coefficients and the second of equaliser coefficients, consequent upon an error formed between the first and the further version of the recovered data portion, the adapted trial equaliser coefficients being used as the equaliser coefficients in the first and the second equalisers.

In preferred embodiments, the first and the second equaliser coefficients are therefore calculated iteratively to minimise the error between the data recovered from the stored received signal samples for the first and the second detecting processors, and a previous version, each version being produced using a further refined set of equaliser coefficients. The first and second trial equaliser coefficients are then communicated to the corresponding equaliser within the corresponding detecting processor. As such, in preferred embodiments, the equaliser coefficients can be calculated from an estimate of the data recovered from the received radio signals. Each trial set of equaliser coefficients is calculated in an iterative way with respect to a previous estimate of the data in dependence upon an error formed between the previous estimate and the subsequently recovered estimate. As such it is not necessary to communicate a known data sequence as part of the received data bearing signal samples.

Furthermore, in order to improve the estimate of the equaliser coefficients which will minimise the error rate in the data recovered from the received radio signals, in preferred embodiments the received signal samples include a section modulated using a modulation scheme having a greater Euclidean distance than another data bearing portion of the received signal samples, the portion of the estimated data being recovered from the section modulated with the greater Euclidean distance.

Euclidean distance is a term with which those skilled in the art are acquainted, and refers to the distance between symbols in the signal constellation in the complex plane of a modulation scheme. The Euclidean distance is explained further in the above referenced publication by J. G. Proakis at page 222–228. In preferred embodiments, the data may be arranged to modulate a first portion of the spread spectrum radio signals using for example Quadrature Phase Shift Keying (QPSK), which has a greater Euclidean distance than for example 8 Quadrature Amplitude Modulation (QAM) 16, 32 or 64 QAM.

In other embodiments the coefficients of the equaliser may be generated by estimating the frequency response of the radio communications channel through which the data has passed, and to generate the first and second equaliser coefficients, consequent upon the estimate of the frequency response of the channel to the effect of reducing the effects of multi-path propagation of the radio channel. The estimate may be generated, for example, by de-convolving the frequency response of a reproduced version of the spread spectrum signals and the received radio signals.

The received data bearing radio signals may be spread spectrum radio signals, so that in preferred embodiments, the data processor may be operable to recover the data by de-spreading the radio signal samples. As mentioned above, embodiments of the present invention find particular but not exclusive application in recovering data from spread spectrum radio signals, such as those used to communicate data in CDMA systems. This is because, although in mobile radio applications the Rake receiver provides an adequate performance, in fixed radio applications, such as for example in fixed wireless access networks, it has been discovered that the linear equaliser provides a better performance in terms of a rate of occurrence of errors in the recovered data for a large number of orthogonal codes and where higher order modulation is being used.

Various further aspects and features of the present invention are defined in the appended claims.

BRIEF DESCRIPTION OF THE DRAWINGS

The present invention will be described further, by way of example only, with reference to a preferred embodiment thereof as illustrated in the accompanying drawings, in which.

DESCRIPTION OF PREFERRED EMBODIMENTS

It will be appreciated that a receiver embodying the present invention finds application in detecting and recovering data from radio signals modulated in accordance with various modulation schemes and is not restricted to any particular multiple access technique. However, although a receiver embodying the present invention may be used in a Time Division Multiple Access (TDMA) system, an example embodiment of the present invention will be described with reference to a communications system which employs CDMA. As already explained, in preferred embodiments the receiver forms part of a wireless access telecommunications system, which will be briefly described in the following paragraphs.

Fixed Wireless Access System

Figure 1:
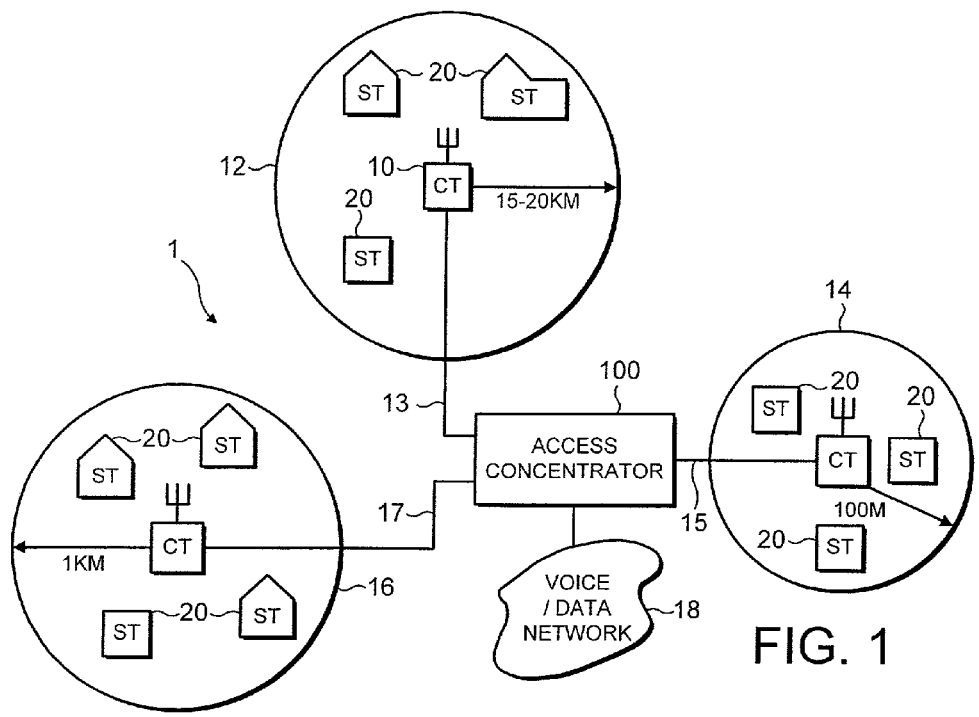
FIG. 1 is a schematic overview of an example of a wireless telecommunications system in which the present invention may be employed.

FIG. 1 is a schematic overview of an example of a wireless telecommunications system. The telecommunications system includes one or more service areas 12, 14 and 16. Each service area is provided with a central terminal (CT) 10 which provide a facility for communicating via radio channels with subscriber terminals (ST) 20 within the service area. The service area can vary in size and geographical characteristics. For example, in a rural area with a low density of subscribers, a service area 12 could cover an area with a radius of 15–20 Km. A service area 14 in an urban environment where there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the particular geographical characteristics local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The wireless telecommunications system of FIG. 1 is arranged to provide contemporaneous radio communications between subscriber terminals 20 at fixed locations within a service area (e.g., 12, 14, 16) and the central terminal 10 for that service area. The radio communications are established over predetermined frequency channels, a frequency channel typically consisting of one frequency for up-link signals from a subscriber terminal to the central terminal, and another frequency for down-link signals from the central terminal to the subscriber terminal.

Accordingly, the radio communications between the STs and the CTs are provided in accordance with a predetermined radio access interface. The radio access interface provides a facility for contemporaneous communications between a plurality of STs and the corresponding CTs. One such radio access interface provides a CDMA radio access interface whereby a set of orthogonal codes may be applied to the data to be transmitted on a particular frequency channel, data relating to different wireless links being combined with different orthogonal codes from the set. Signals to which an orthogonal code have been applied can be considered as being transmitted over a corresponding orthogonal channel within a particular frequency channel.

One way of operating such a wireless telecommunications system is in a fixed assignment mode, where a particular ST is directly associated with a particular orthogonal channel of a particular frequency channel. Calls to and from items of telecommunications equipment connected to that ST will always be handled by a pre-allocated orthogonal channel, having a particular frequency channel, the orthogonal channel always being available and dedicated to that particular ST. Each CT 10 can then be connected directly to the switch of a voice/data network 18, for example the switch of a public switched telephone network (PSTN) via an Access Controller (AC) 100. In the following description, a PSTN is referenced as an example of the voice/data network.

As the number of users of telecommunications networks increases, so there is an ever-increasing demand for such networks to be able to support more users. To increase the number of users that may be supported by a single central terminal, an alternative way of operating such a wireless telecommunications system is in a Demand Assignment mode, in which a larger number of STs are associated with the central terminal than the number of traffic-bearing orthogonal channels available to handle wireless links with those STs, the exact number supported depending on a number of factors, for example the projected traffic loading of the STs and the desired grade of service. These orthogonal channels are then assigned to particular STs on demand as needed. This approach means that far more STs can be supported by a single central terminal than is possible in a fixed assignment mode. In preferred embodiments of the present invention, each subscriber terminal 20 is provided with a demand-based access to its central terminal 10, so that the number of subscribers which can be serviced exceeds the number of available wireless links.

For general background information on how the AC, CT and ST may be arranged to communicate with each other to handle calls in a Demand Assignment mode using a transport mechanism suitable for continuous data sequences such as voice data, the reader is referred to GB-A-2,326,310 and GB-A-2,326,311.

Figure 2:
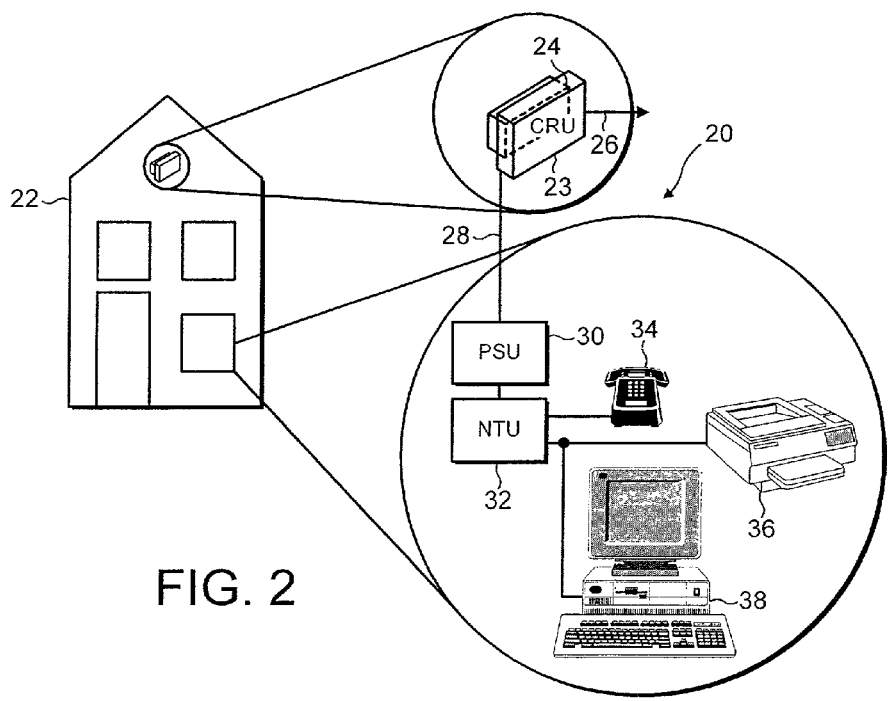
FIG. 2 is a schematic illustration of an example of a subscriber terminal of the telecommunications system of FIG. 1.

FIG. 2 illustrates an example of a configuration for a Subscriber Terminal 20 for the telecommunications system of FIG. 1. FIG. 2 includes a schematic representation of customer premises 22. A Customer Radio Unit (CRU) 24 is mounted on the customer's premises. The CRU 24 includes a flat panel antenna or the like 23. The CRU is mounted at a location on the customer's premises, or on a mast, etc., and in an orientation such that the flat panel antenna 23 within the CRU 24 faces in the direction 26 of the CT 10 for the service area in which the CRU 24 is located.

The CRU 24 is connected via a drop line 28 to a power supply unit (PSU) 30 within the customer's premises. The power supply unit 30 is connected to the local power supply for providing power to the CRU 24 and a Network Terminal Unit (NTU) 32. The CRU 24 is also connected via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the ST 20 can support multiple lines, so that several subscriber lines could be supported by a single ST 20. The ST 20 can also be arranged to support analogue and digital telecommunications, for example analogue communications at 16, 32 or 64 kbits/sec or digital communications, e.g. Internet protocol (IP), ISDN BRA standard, leased line data (n×64K), etc.

Further details of the fixed wireless access communications system and more specific implementation details of the air interface are disclosed in co-pending UK patent application number 0023689.3. Generally, however embodiments of the present invention utilise receiver diversity.

Diversity Receiver

Figure 3:
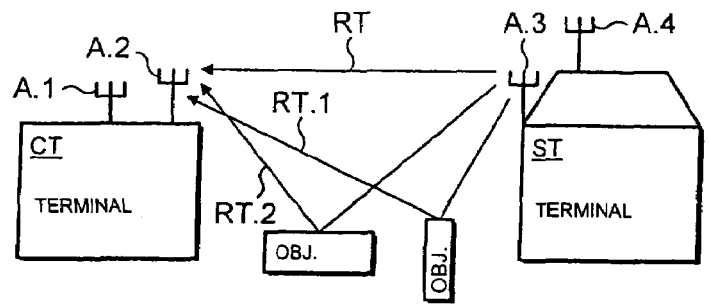
FIG. 3 is a schematic diagram illustrating the propagation of radio signals between the subscriber terminal and the central terminal of FIG. 1 respectively.

A receiver according to an embodiment of the present invention may be incorporated at either the ST or the CT or both. Accordingly, FIG. 3 shows generally an arrangement in which both the CT and the ST are provided with two antennae for detecting and transmitting CDMA signals. Although both the CT and the ST are shown with two antennae it will be appreciated that this is just an illustration and either the CT or the ST may have only one antenna.

Correspondingly, it will be appreciated that although in FIG. 3 the CT and the ST have two antennae, preferably in other embodiments more than two antennae may be used each providing a different version of the received radio signal.

As shown in FIG. 3 an example illustration of the propagation of the radio signals RT, RT.1, RT.2 from the ST antennae A.3, A.4 to the CT antennae A.1, A.2 is provided. As shown the radio signals which arrive at the antennae include a direct component RT, and two multi-path components RT.1, RT.2. As represented in FIG. 3, versions of the radio signals which comprise the two multi-path components RT.1, RT.2 travel via respective routes that include reflections off objects OBJ, and are longer than the direct path component to reach the receiver antennae A.1, A.2 and so will arrive at different times.

An advantage of a receiver embodying the present invention is that the receiver may be implemented in a modular form with a number of modules corresponding to the number of antennae. For the example of the CT having two antennae as shown in FIG. 3, a receiver chain which is arranged to detect and recover data from the CDMA signals is shown in FIG. 4.

Figure 4:
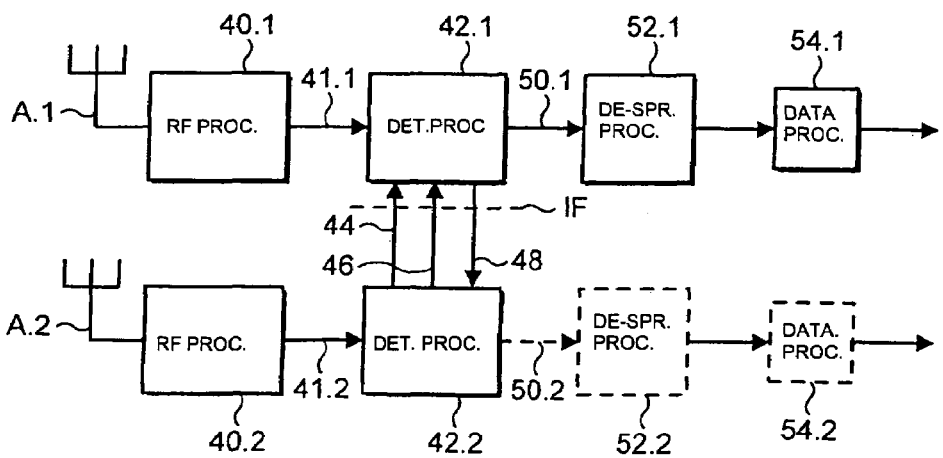
FIG. 4 is a schematic block diagram of a receiver forming part of the central or the subscriber terminals.

In FIG. 4 the first and second antennae A.1, A.2 of the CT are each shown to be connected to an input of a Radio Frequency (RF) processor 40.1, 40.2. Respectively connected to an output of each of the RF processors 40.1, 40.2 are first and second detecting processors 42.1, 42.2. The first and second detecting processors 42.1, 42.2 are inter-connected by three channels 44, 46, 48 according to a predetermined interface IF. The purpose and function of these channels 44, 46, 48 will be explained shortly. However the first and second detecting processors operate in combination to equalise and combine different versions of the CDMA signals received from the first and second antennae A.1, A.2 and to produce a composite output signal. The composite output signal is presented on an output channel 50.1, 50.2 which is fed to a de-spreading processor 52.1, 52.2.

The de-spreading processor 52.1, 52.2 de-spreads the composite signal and produces an estimate of the data with which the spread spectrum signals were modulated in accordance with the CDMA air interface. The estimate of the data is then processed by a further data processor 54.1, 54.2 which may perform, for example, error correction decoding and other processing to the effect of improving the probability of correctly detecting the data which has been communicated from the ST. The operation of the first and the second detecting processors in accordance with an embodiment of the present invention will now be described with reference to FIG. 4.

Figure 5:
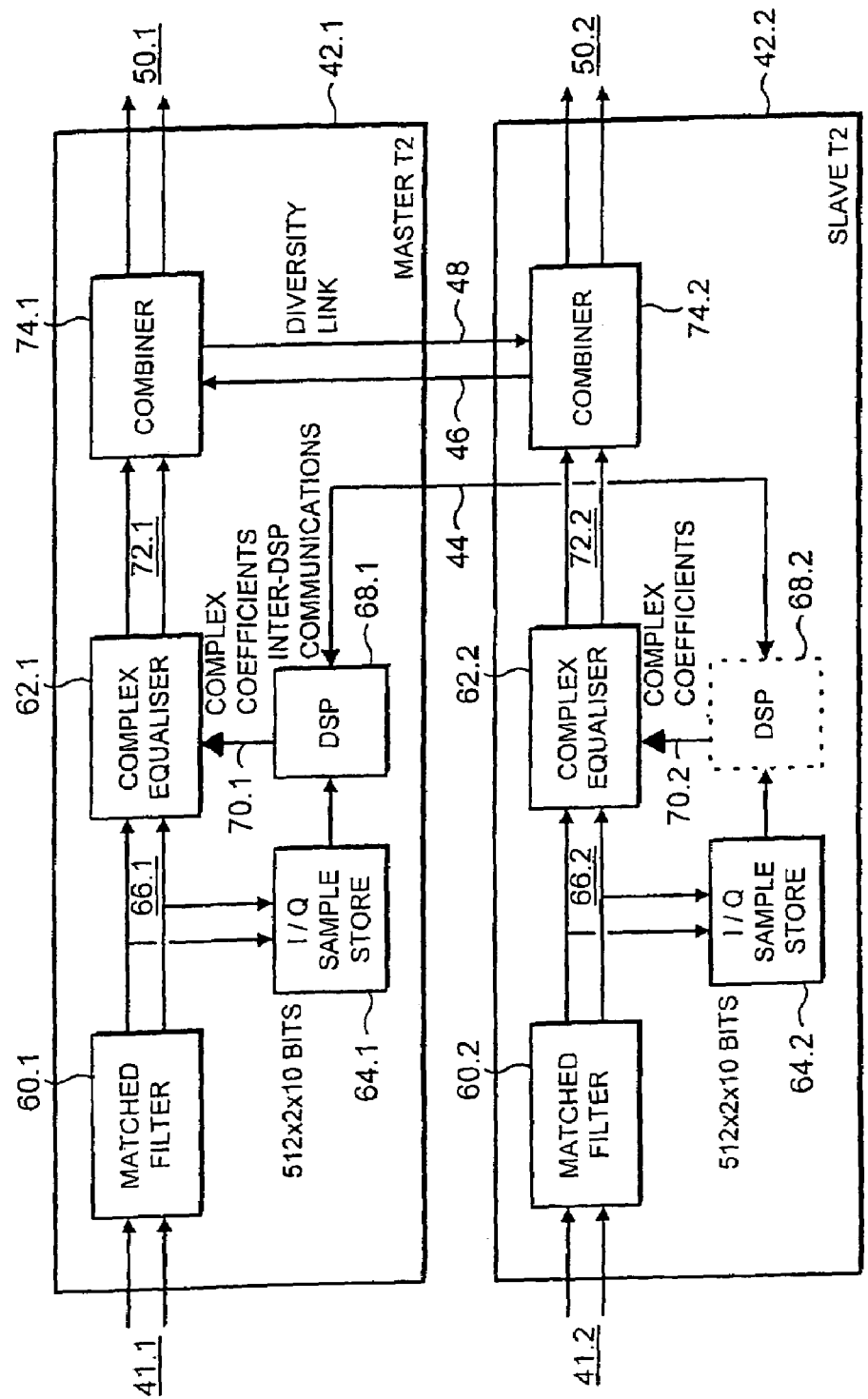
FIG. 5 is a schematic block diagram of two of the detecting processors of the receiver shown in FIG. 4.

In FIG. 5 the first and second detecting processors 42.1, 42.2 are shown to receive respectively via the two parallel channels 41.1, 41.2 in phase I and quadrature Q complex components of the respective versions of the sampled CDMA signal.

The RF processors 40.1, 40.2 down convert the received radio signals to a base band form, and sample the signals to produce the complex signal samples, using an A-to-D converter. The samples are presented to the detecting processors 42.1, 42.2 on respective input channels 41.1, 41.2. The complex signal samples are received within each of the detecting processors by a matched filter 60.1, 60.2. The matched filter has an impulse response which provides spectral shaping for the received signal samples. In preferred embodiments, the matched filter 60.1, 60.2 has an impulse response corresponding to the root raised cosine response. With a corresponding response used at the transmitter of the radio signals, a raised cosine response is provided, to reduce, as far as possible, inter-symbol interference caused by the spectral shaping filters.

Complex signal samples at the output of the matched filters are fed to respective inputs of an equaliser 62.1, 62.2 and a complex sample store 64.1, 64.2 via parallel channels 66.1, 66.2.

In each of the first and the second detecting processors, a data processor 68.1, 68.2 is arranged to receive the complex samples from the sample store 64.1, 64.2. The data processor 68.1, 68.2 is also arranged to receive complex samples from at least one other data processor from one of the other detecting processors via the connecting channel 44. The data processor 68.1 for the example embodiment shown in FIG. 5 is arranged to calculate the complex equaliser coefficients, both for the first detecting processor 42.1 for the complex equaliser 62.1 and for the second data processor 42.2 for the complex equaliser 62.2. These are fed respectively to the equalisers 62.1, 62.2 via connecting channel 70.1, 70.2. As already mentioned, the equalisers 62.1, 62.2 are operable to produce as far as possible the inter-symbol interference produced by multi-path propagation experienced by the received CDMA signals.

In preferred embodiments, the complex equaliser 62.1, 62.2 are linear equalisers and combine the received signal samples with the equaliser coefficients to produce at output channels 72.1, 72.2 refined complex signal samples which are fed respectively to the input of a combiner 74.1, 74.2.

The combiners 74.1, 74.2 are arranged to exchange complex signal samples via connecting channels 46, 48 respectively representative of the refined signals from the equaliser of the corresponding detecting processor. Effectively, therefore, the combiners 74.1, 74.2 are arranged to combine the refined signals from each of the first and second detecting processors in order to form a composite signal on the respective parallel conductors 50.1, 50.2. In preferred embodiments, the combiners 74.1, 74.2 operate in accordance with maximum ratio combining in order to weight contributions from each diversity branch in accordance with the signal to noise ratio for that branch.

The operation of the first and second detecting processors shown in FIG. 5 will now be explained in more detail. For the example arrangement in FIG. 5 in which there are two diversity branches provided by the first and second antennae A.1, A.2, one of the two detecting processors acts as a master and the second of the two acts as a slave. In FIG. 5, it is assumed that the upper first detecting processor acts as the master and the second detecting processor acts as a slave.

As already explained, the receiver according to the present invention is arranged to detect and recover data from the spread spectrum radio signals produced in accordance with a CDMA radio access interface by using a linear equaliser to compensate for the effects of multi-path propagation. It has been discovered that linear equalisation offers benefits over other receivers such as the Rake receiver. In particular, where multi-path propagation is relatively unsevere, in that the delay spread is relatively small and may include a direct path component. Furthermore, where the received signal is to be detected in the presence of a large number of orthogonal carriers and a high order modulation scheme is used, such as for example 16QAM, demanding a high signal to noise ratio (Eb/No), the linear equaliser out performs the Rake receiver in terms of, for example, the bit error rate performance at a given signal to noise ratio. Such conditions are typically present in a fixed wireless access communications system, such as that used to illustrate the example embodiment of the present invention. Therefore, it will be appreciated that embodiments of the present invention find particular application with such fixed wireless access system.

Calculation of Equaliser Coefficients

In order to perform equalisation of the received signal, the coefficients of the equaliser are calculated in order to reduce the inter symbol interference, which may present in the received signals. To this end, the data processor 68.1, 68.2 on both the first and the second detecting processors access the complex sample store 64.1, 64.2 to capture a fixed interval of the received signal samples at the output of the matched filter 60.1, 60.2. The data processor 68.1 on the master detecting processor also receives the complex samples from the second detecting processor from the complex sample store 64.2 under control of the data processor 68.2 of the second detecting processor. The data processor 68.1 of the first detecting processor acting as the master calculates the equaliser coefficients for the equaliser 62.1, 62.2 of both the first and the second detecting processors, so as to reduce the likelihood of errors in the data recovered from the composite signal, that is the signal after equalisation and after combining by the combiner (74.1, 74.2). To this end, the data processor 68.1 is arranged to calculate the first and second equaliser coefficients jointly.

There are various techniques for calculating the coefficients of a linear equaliser. However, in preferred embodiments the data processor 68.1 operates substantially as illustrated in FIG. 6, in order to calculate the equaliser coefficients using a decision directed technique.

Figure 6:
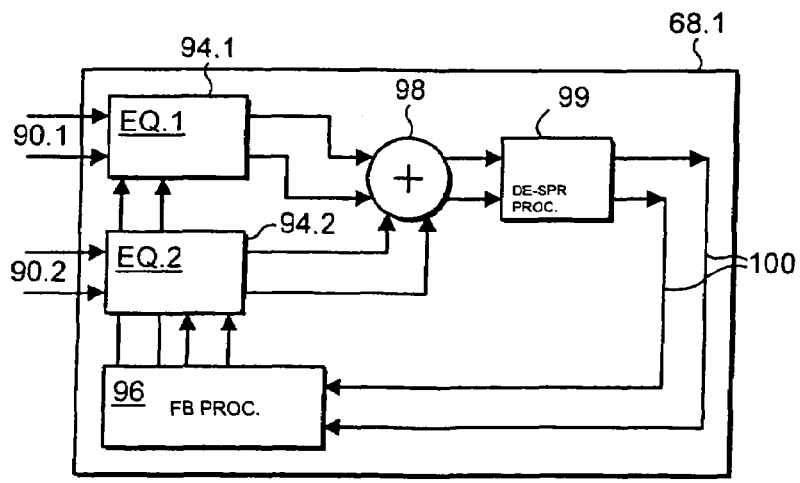
FIG. 6 is a schematic block diagram illustrating a possible arrangement of the data processor in the detecting processor shown in FIG. 5.

In FIG. 6 the first and second inputs 90.1 and 90.2 are shown to be received by first and second trial equalisers 92.1 and 92.2. The first and second inputs 90.1, 90.2 feed the complex signal samples from the complex sample store 64.1, 64.2 of the first and second detecting processors. In the example embodiment illustrated FIGS. 5 and 6 the sample stores are arranged to capture 512 complex samples each sample being represented with a resolution of 10 bits. The 512 samples provide a quarter chip resolution for a portion of the received data.

Figure 8:
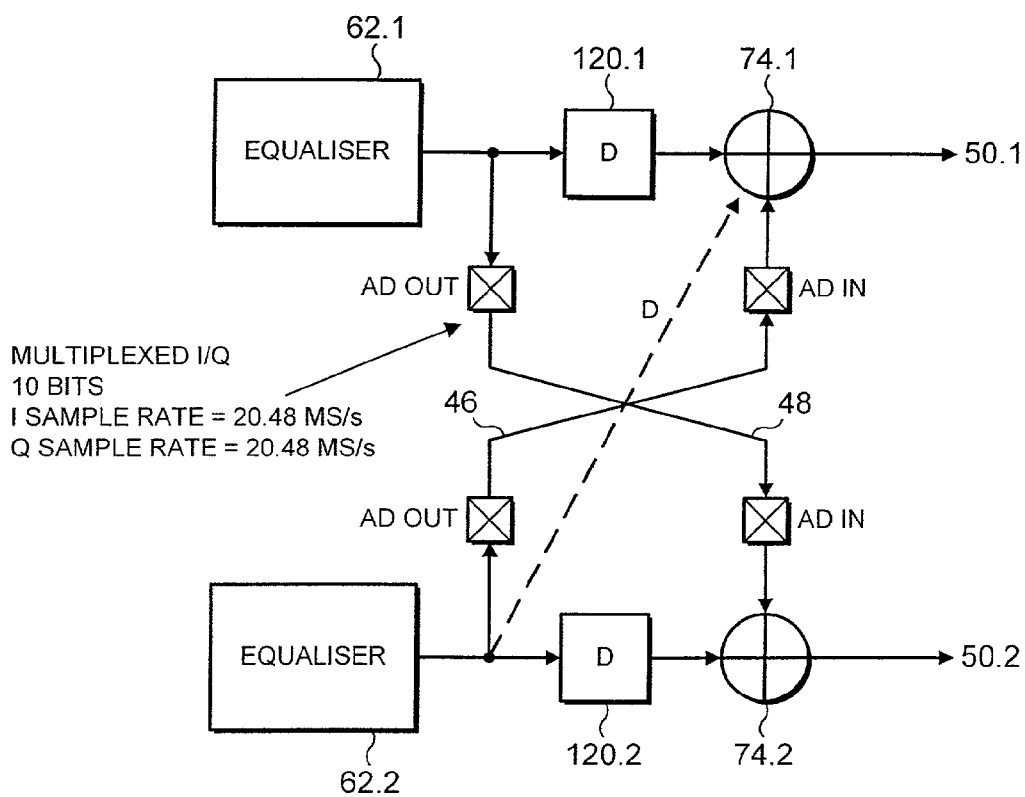
FIG. 8 is a schematic block diagram illustrating the operation of parts of the receiver shown in FIG. 5.

In the example embodiment, the data is received in the form of bursts having different parts. The first part of the burst is modulated in accordance with QPSK modulation and the second half of the burst carrying the data is modulated in accordance with a higher order modulation scheme, such as, for example 8, 16, 32 or 64-QAM. This burst format is illustrated schematically in FIG. 8. Although it will be appreciated that the present invention can be applied with any modulation scheme and data format, the burst format shown in FIG. 8 provides a facility for generating the equaliser coefficients which will improve the likelihood of correctly recovering the data. This is because the QPSK modulation scheme has a higher Euclidean distance than the higher order modulation schemes such as 8, 16, 32 or 64-QAM. As a result, the data detected from the QPSK modulation scheme will have a higher probability of being detected correctly produced by a greater immunity to noise, because of the greater Euclidean distance. For this reason, the equaliser coefficients can be calculated by the data processor 68.1, using a decision directed technique, described below, using the data recovered from the QPSK modulated.

Figure 7:
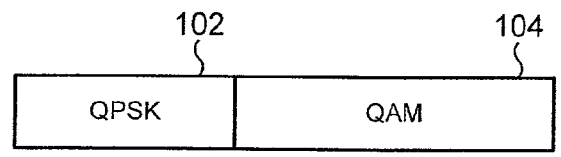
FIG. 7 is a schematic block diagram of a format of a burst of radio signals which is used in the fixed wireless access system to communicate data.

As shown in FIG. 6, the recovered base band signal samples are fed respectively to first and second trial equalisers 94.1, 94.2, from the respective sample stores. As before the parallel channels are provided in order to feed the complex signal samples to the trial equalisers 94.1, 94.2. The trial equalisers 94.1, 94.2 are arranged to receive a complex set of trial equaliser coefficients from feed back processor 96. The trial equalisers 94.1, 94.2 are operable to model the linear equalisers 62.1, 62.2 of the first and second detecting processors. After combining the stored signal samples with the equaliser coefficients, the outputs from the first and second trial equalisers 94.1 and 94.2 are combined by a combiner means 98 to produce a composite signal estimate. The trial composite signal is then received by a despreading processor 99, which recovers the data from the first portion 102 (FIG. 7) of the received burst. The recovered data is then fed back via connecting channels 100 to the feed back processor 96. The feed back processor 96 then forms decision directed adjustment of the equaliser coefficients to the effect of minimising the error between the recovered version of the data produced from the QPSK part 102 (FIG. 7) of the received burst and an estimate of this data previously produced from the trial composite signal from the combiner means 98. As such, according to an iterative process the equaliser coefficients are adjusted in order to reduce an error between the currently recovered version of the data from the QPSK modulated part of the burst and previous versions of this data. The reduction of the error is determined in accordance the least mean squared error between versions of the recovered data.

In effect, therefore the data processor 68.1 of the master first detecting processor 42.1 is arranged to optimise the first and the second equaliser coefficients so as far as possible to reduce the likelihood of errors in the data detected from the resulting composite signal produced at the output of the combiner 74.1. After a predetermined number of iterations, the trial equaliser coefficients are then fed to the respective equalisers in the corresponding detecting processors.

Embodiments of the present invention therefore provide an advantage in optimising the linear equaliser coefficients jointly in dependence upon a result of the refined data which has been combined by the combiner in accordance with for example maximum ratio combining. A further advantage is provided in that the modular construction of the detecting processors as shown in FIG. 5 provides a facility for adding further processors as the number of diversity branches increases. As such, after connecting a plurality of detecting processors together, one of the detecting processors is determined to be the master and the slave detecting processors communicate the complex samples from the respective sample stores in order to effect calculation of the equaliser coefficients.

As will be appreciated the data processor 68.1 perform a relatively complicated calculation in order to generate the equaliser coefficients jointly. However, in preferred embodiments in which the receiver is used in a fixed wireless access system, the radio channel is likely to change relatively slowly. For this reason, the data processor 68.1, 68.2 can be arranged to calculate periodically the new equaliser coefficients without an undue degradation in the likelihood of correctly detecting the data. As such the calculation of the equaliser coefficients does not have to be made each time a burst of radio signals is received.

As will be appreciated there are applications in which it is appropriate to provide two composite output signals. To this end, the second detecting processor also provides an output signal on the connecting channel 50.2. Accordingly, the cross coupling between the first and the second detecting processors form a dual diversity receiver as illustrated schematically in FIG. 8. In FIG. 8 the cross coupling at the output of the respective equalisers is provided as shown by the connecting channels 46, 48 between the first and second detecting processors 42.1, 42.2. In order to ensure that the signal samples corresponding to those produced from the equaliser of one of the detecting processors are received at a corresponding time to those generated by the other of the equalisers, a delay 'D' is introduced by respective delay elements 120.1, 120.2.

OTHER EMBODIMENTS

Figure 9:
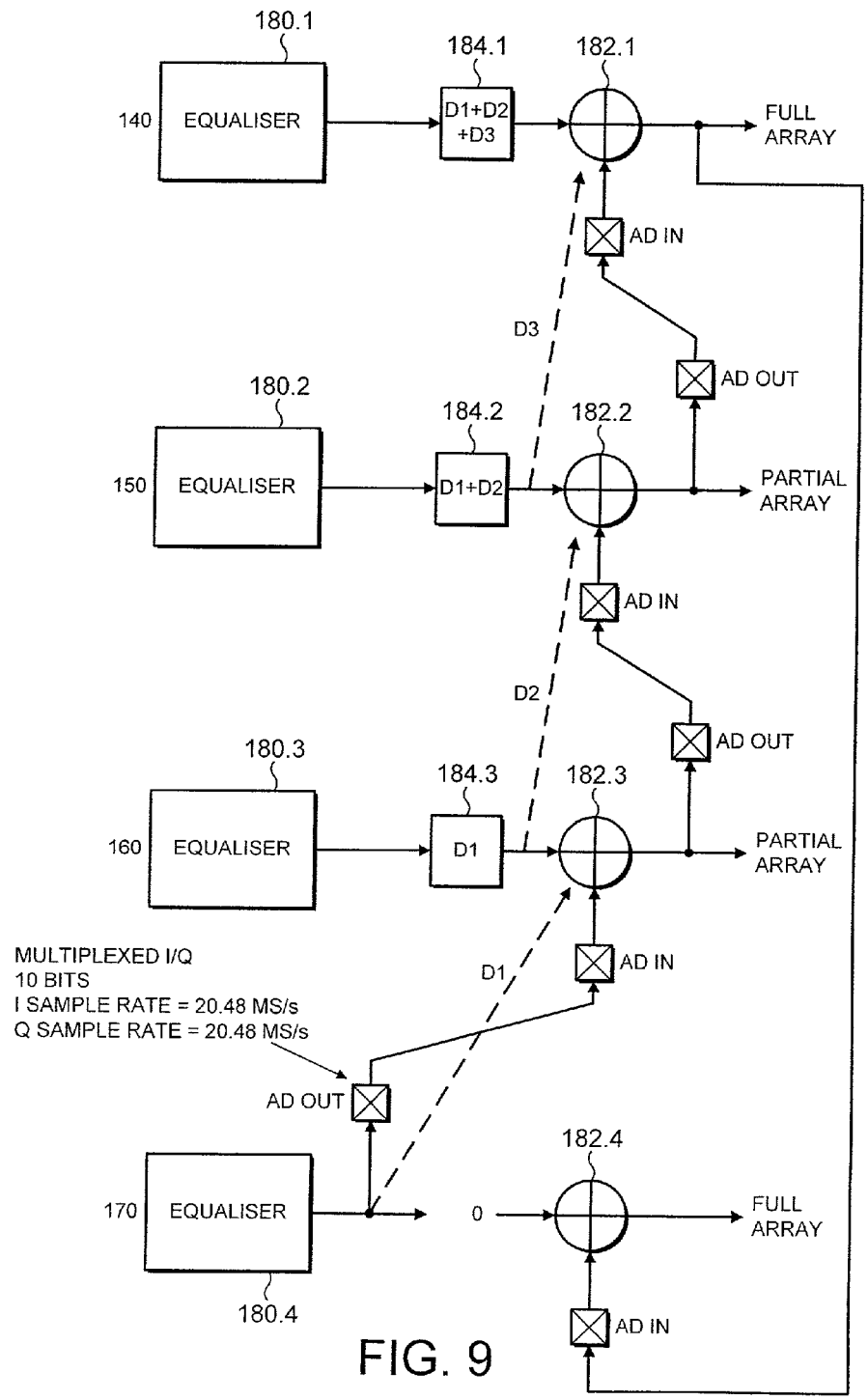
FIG. 9 is a schematic block diagram illustrating the operation of a receiver having four detecting processors.

As already explained although the example embodiment has been illustrated with two diversity branches and therefore correspondingly two detecting processors, in other embodiments a greater number of antenna diversity branches can be used with a corresponding number of detecting processors. FIG. 9 provides an example illustration corresponding to the diagram shown in FIG. 8 in which four antenna diversity branches are combined in accordance with an embodiment of the present invention. The four branches are represented schematically as detecting processors 140, 150, 160, 170. Generally, each of the detecting processors 140, 150, 160, 170 corresponds to the detecting processors illustrated in FIG. 5 and so a complete description will not be provided. However as illustrated in FIG. 9 each of the equalisers 180.1, 180.2, 180.3, 180.4 provides a refined output signal which is fed to a corresponding combiner 182.1, 182.2, 182.3, 182.4 via a corresponding delay element 184.1, 184.2, 184.3. As shown in FIG. 9 in order to compensate for the relative time at which the refined signal samples are produced at the outputs of the respective equalisers 140, 150, 160, 170, the delay elements 184.1, 184.2, 184.3 are provided with a progressively decreasing delay starting with the first detecting processor 184.1 which has a delay of D1+D2+D3 until the fourth detecting processor which is not provided with a delay element. As will be appreciated each of the outputs from the combiners 182.1, 182.2, 182.3, 182.4 could provide a fully combined composite signal by combining the signals from the three other detecting processors. However this is not shown in FIG. 9, in order to reduce complexity of this diagram.

As will be appreciated various modifications may be made to the embodiments described above without departing from the scope of the present invention. In particular, for example the invention finds application in receiving any type of spread spectrum signal and is not limited to a fixed wireless access system. The present invention can be used for mobile radio systems using any modulation scheme.

Although in the example embodiment, the data processor is operable to generate the equaliser coefficients in accordance with a decision directed technique, it will be appreciated that this is just one example, and in other embodiments the equaliser coefficients may be calculated in a different way. These include, for example, transmitting a known data sequence with the CDMA signals. By minimising an error between the part of the received signal samples containing the known data sequence and a reproduction of this known data sequence itself, the equaliser coefficients can be adjusted recursively until the error between the recovered data sequence and the original known data sequence is minimised. Again this can be performed to reduce the minimum mean square error. Other techniques for calculating the equaliser coefficients include de-convolution. De-convolution requires calculation of the frequency response of the radio channel using for example a training sequence. Alternatively, the frequency response of the radio channel can be determined by estimating the spectrum of the received signal, which is then divided by the frequency response of the spread spectrum signal modulated with the recovered data and the result converted back to the time domain.

Furthermore, although in preferred embodiments, data is arranged to modulate the phase of the spread spectrum signal, which requires coherent detection, thereby demanding the generation of complex signal samples, in other embodiments, the phase may not be detected and so the received signal samples may real only and not complex.

We claim:
1. A receiver for detecting and recovering data from received data bearing radio signal samples, said receiver comprising first and second detecting processors, each of said first and second detecting processors comprising
a data store operable to store said received signal samples,
an equaliser operable to combine said received signal samples with a plurality of equaliser coefficients, to produce refined signal samples representative of said received signal samples but with the effect of inter-symbol interference caused by multi-path propagation of said received radio signals at least partially reduced;
a combiner means operable to receive the refined signal samples from said equaliser and to receive further refined signal samples, and to combine said refined signal samples and said further refined signal samples; and
a data processor operable to receive said stored signal samples from said data store,
wherein in said first detecting processor said further refined signal samples come from the second detecting processor, and in said second detecting processor said further refined signal samples come from the first detecting processor, and
wherein the data processor of said first detecting processor is operable to receive second stored signal samples from said second detecting processor and to adapt the equaliser coefficients of said first detecting processor and the equaliser coefficients of said second detecting processor in dependence upon said received signal samples stored in said data store of said first detecting processor and in said data store of said second detecting processor, to the effect of increasing the probability of correctly recovering data from the received radio signal samples.

2. A receiver as claimed in claim 1, wherein said data processor of said first detecting processor comprises
first and second trial equalisers operable to combine said received signal samples stored by the data store of the first detecting processor and said received signal samples stored by the date store of the second detection processor with first and second trial equaliser coefficients, to produce first and second trial refined signal samples,
a combiner operable to combine said first and second trial refined signal samples to form a trial composite signal,
a de-modulating processor operable to de-modulate said trial composite signal to recover at least a portion of said data, and
a feed back processor operable to control said first and said second trial equalisers, said combiner and said de-modulating processor to form a further version of said recovered portion of said data and to adapt said first and said second trial equaliser coefficients, consequent upon an error formed between said first and said further versions of said recovered data portion, said adapted first and second trial equalisers coefficients being used as the equaliser coefficients in said equalisers of said first and second detecting processors.

3. A receiver as claimed in claim 2, wherein said data processor of said first detecting processor adapts said equaliser coefficients for each of a plurality of iterations each version forming a further refined version of said data portion, to the effect of minimising an error between said further version and a previous version of said portion of said data.

4. A receiver as claimed in claim 2, wherein said data processor of said first detecting processor adapts said coefficients to the effect of minimising a least mean square of the error.

5. A receiver as claimed in claim 2, wherein said received signal samples include a section modulated using a modulation scheme having a greater Euclidean distance than another data bearing portion of the received signal samples, said portion of the estimated data being recovered from the section of said received signal samples modulated with the greater Euclidean distance.

6. A receiver as claimed in claim 1, wherein said data processor comprises a de-convolution processor operable to generate an estimate of a frequency response of a radio communications channel through which said received radio signals have passed, by de-convolving the frequency response of said recovered data from the frequency response of said received signal samples, and to generate said first and second equaliser coefficients from said estimate of the frequency response of the radio communications channel.

7. A receiver as claimed in claim 1, wherein said received signal includes a known data sequence, said stored signal samples representing said known data sequence, said data processor being operable to recover said known data sequence by de-modulating said stored samples and to adapt said first and second equaliser coefficients, consequent upon an error formed between said recovered data sequence and said original data sequence.

8. A receiver as claimed in claim 7, wherein said control processor adapts said equaliser coefficients for each of a plurality of iterations such that said error is minimised.

9. A receiver as claimed in claim 7, wherein said data processor adapts said coefficients such that a least mean square of the error is minimised.

10. A receiver as claimed in claim 1, wherein said first and said second detecting processors are fabricated as modules having a predetermined interface, said interface providing the facility for communicating said stored signal samples, said equaliser coefficients and refined signals to another detecting processor.

11. A receiver as claimed in claim 1, wherein said data processors of said first and second detecting processors are operable to determine which of said first and second detecting processors acts as a master detecting processor in which the data processor of said master detecting processor calculates the equaliser coefficients for the equaliser of both said first and second equalisers.

12. A receiver as claimed in claim 1, comprising a first antenna and a second antenna, said first antenna being coupled to said first detecting processor providing a first version of said received signal, and said second antenna being coupled to said second detecting processor providing a second version of said received signal.

13. A receiver as claimed in claim 1, wherein at least one of said first and said second detecting processors includes a delay element to delay said refined signal samples generated by said equaliser such that the refined signal samples from the equaliser of the other detecting processor are received contemporaneously with said refined signal samples with which said other samples are to be combined.

14. A receiver as claimed in claim 1, wherein said received data bearing radio signal is a spread spectrum radio signal, said data processor being operable to recover said data from said data by de-spreading said radio signal samples.

15. A receiver as claimed in claim 1, wherein said equaliser is a linear equaliser.

16. A fixed wireless access communications system having a receiver as claimed in claim 1.

17. A detecting processor for use in a diversity receiver in detecting and recovering data from received radio signal samples, said detecting processor comprising a data store operable to store said received signal samples, an equaliser operable to combine said received signal samples with a plurality of equaliser coefficients, to produce first refined signal samples representative of said received signal samples but with the effect of inter-symbol interference caused by possible multi-path propagation of said received radio signals at least partially reduced, a combiner means operable to receive the first refined signal samples from said equaliser and to receive second refined signals samples derived from a further received version of said received signal, and to combine said first and second refined signal samples, and a data processor operable to receive said stored signal samples from said data store, and to receive second stored signal samples and to adapt said equaliser coefficients and second equaliser coefficients, to the effect of increasing the probability of correctly recovering data from the received radio signal samples the second equaliser coefficients being for use in forming the second refined signal samples by combining the second equaliser coefficients with the further received version of the received signal.

18. A detecting processor as claimed in claim 17, wherein said received radio signal samples are derived from received spread spectrum radio signals, said data processor being operable to recover said data by de-spreading said radio signal samples.

19. A detecting processor as claimed in claim 17, wherein said equaliser is a linear equaliser.

20. A method of detecting and recovering data from received data bearing radio signal samples using first and second detecting processors, said method comprising storing said received signal samples in a data store of the first detecting processor, combining within an equaliser of the first detecting processor said received signal samples with a plurality of first equaliser coefficients to produce first refined signal samples representative of said received signal samples but with the effect of inter-symbol interference caused by multi-path propagation experienced by said received radio signal at least partially reduced, receiving the first refined signal samples from the equaliser and second refined signals samples derived from a further received version of said received signal from the second detecting processor, combining said first and second refined signal samples in a combiner of the first detecting processor, receiving said stored signal samples front said data store in a data processor of the first detecting processor, and receiving second signal samples from a second data store of the second detecting processor and second equaliser coefficients from the second detecting processor, and adapting said first equaliser coefficients and said second equaliser coefficients to the effect of increasing the probability of correctly recovering data from the received radio signal samples.

21. A receiver for detecting and recovering data from received data bearing radio signal samples, said receiver comprising first and second detecting processors, each of said first and second detecting processors comprising:

a data store operable to store said received signal samples;

an equaliser operable to combine said received signal samples with a plurality of equaliser coefficients, to produce refined signal samples representative of said received signal samples but with the effect of inter-symbol interference caused by multi-path propagation of said received radio signals at least partially reduced;

a combiner means operable to receive the refined signal samples from said equaliser and to receive further refined signal samples, and to combine said refined signal samples and said further refined signal samples; and a data processor operable to receive said stored signal samples from said data store, wherein in said first detecting processor said further refined signal samples come from the second detecting processor, and in said second detecting processor said further refined signal samples come from the first detecting processor, and wherein the data processor of said first detecting processor is operable to receive second stored signal samples from said second detecting processor and to adapt the equaliser coefficients of said first detecting processor and the equaliser coefficients of said second detecting processor in dependence upon said received signal samples stored in said data store of said first detecting processor and in said data store of said second detecting processor, to the effect of increasing the probability of correctly recovering data from the received radio signal samples, said data processor of said first detecting processor comprising a first trial equaliser operable to combine said received signal samples stored by the data store of the first detecting processor with first trial equaliser coefficients, to produce first trial refined signal samples;

a second trial equaliser operable to combine said received signal samples stored by the data store of the second detecting processor with second trial equaliser coefficients, to produce second trial refined signal samples;

a combiner operable to combine said first and second trial refined signal samples to form a trial composite signal, a de-modulating processor operable to de-modulate said trial composite signal to recover at least a portion of said data, and a feed back processor operable to control said first and said second trial equalisers, said combiner and said de-modulating processor to form a further version of said recovered portion of said data and to adapt said first and said second trial equaliser coefficients, consequent upon an error formed between said first and said further versions of said recovered data portion, said adapted first and second trial equalisers coefficients being used as the equaliser coefficients in said equalisers of said first and second detecting processors, and said data store of said first detecting processor and said data store of said second detecting processor connected in parallel with paths of said received data bearing radio signal samples into said equaliser of said first detecting processor and said equaliser of said second detecting processor.

22. A receiver for detecting and recovering data from received data bearing radio signal samples, said receiver comprising first and second detecting processors, each of said first and second detecting processors comprising:

a data store operable to store said received signal samples;

an equaliser operable to combine said received signal samples with a plurality of equaliser coefficients, to produce refined signal samples representative of said received signal samples but with the effect of inter-symbol interference caused by multi-path propagation of said received radio signals at least partially reduced;

a combiner means operable to receive the refined signal samples from said equaliser and to receive further refined signal samples, and to combine said refined signal samples and said further refined signal samples; and a data processor operable to receive said stored signal samples from said data store, wherein in said first detecting processor said further refined signal samples come from the second detecting processor, and in said second detecting processor said further refined signal samples come from the first detecting processor, and wherein the data processor of said first detecting processor is operable to receive second stored signal samples from said second detecting processor and to adapt the equaliser coefficients of said first detecting processor and the equaliser coefficients of said second detecting processor in dependence upon said received signal samples stored in said data store of said first detecting processor and in said data store of said second detecting processor, to the effect of increasing the probability of correctly recovering data from the received radio signal samples, and said data store of said first detecting processor and said data store of said second detecting processor connected in parallel with paths of said received data bearing radio signal samples into said equaliser of said first detecting processor and said equaliser of said second detecting processor.

* * * * *